G. W. CROWE.
Railroad-Car Brakes.
No. 140,349.
Patented July 1, 1873.
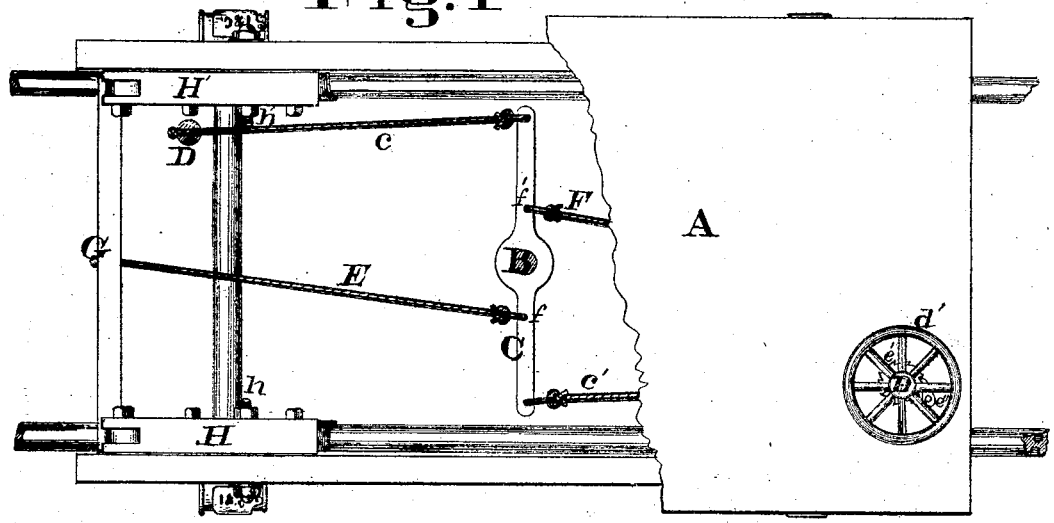
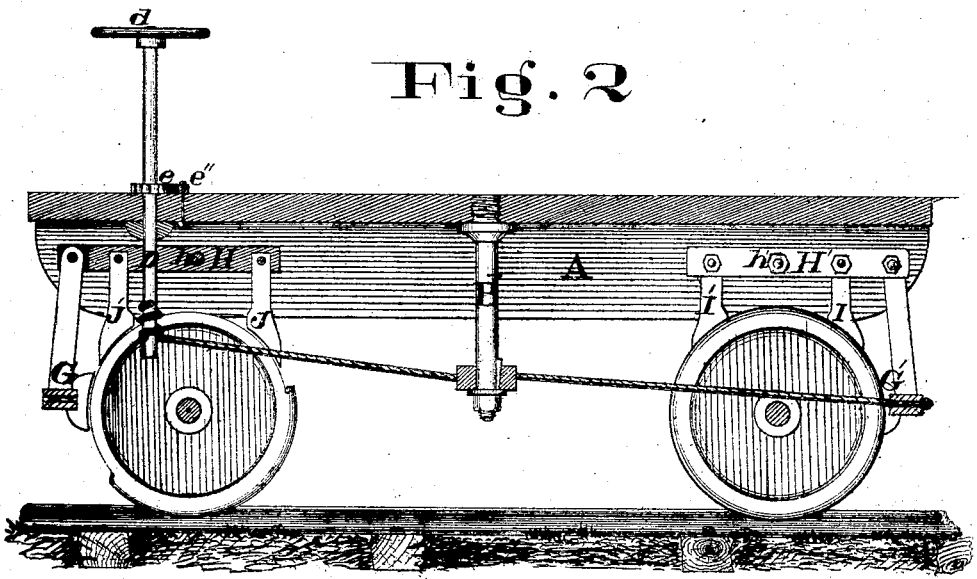

UNITED STATES PATENT OFFICE.

GEORGE W. CROWE, OF CINCINNATI, OHIO.

IMPROVEMENT IN RAILROAD-CAR BRAKES.

Specification forming part of Letters Patent No. 140,349, dated July 1, 1873; application filed September 11, 1872.

*To all whom it may concern:*

Be it known that I, GEORGE W. CROWE, of Cincinnati, Hamilton county, Ohio, have invented a certain new and useful Improvement in Brakes for Railroad Cars, of which the following is a specification:

My invention consists of a brake so constructed and attached to a railway car that it exerts a much greater pressure upon the wheel than is obtained by those in common use, and, by a system of leverage and auxiliary brakes, causes the rotary movement of the wheel itself to contribute to the pressure upon its periphery.

Figure 1 is a plan of a railway truck and brake embodying my invention. Fig. 2 is a partially-sectionized elevation of the same.

A is the frame or truck of a railway car, having at its midlength the vertical post B, upon which swivels a double lever, C, to each end of which are attached cords or chains $c\ c'$, the other ends of which are wound upon the upright posts D D', which support the common hand-wheels $d\ d'$ and ratchet $e\ e'$ and pawls $e''\ e''$ of the customary brake. Similar cords or chains E F are attached to the lever C at points $f\ f'$, a short distance from the pivot B, and are secured to the brakes G G', which are by this means drawn forcibly against the wheels, when, by the action of the hand-wheels $d\ d'$, the cords $c\ c'$ are wound upon the uprights D D'. The brakes G G' depend from the long arms of levers H H', which have their fulcrums upon the bolts $h\ h'$, which secure them to the truck. Attached at the extremity of the short arms of the levers H H', and at points equidistant from the fulcrum upon the long arms, are auxiliary brakes I I' J J', the action of which is as follows: When the brakes G G' are drawn forcibly against the wheel by the levers C and cords E F, if the car is moving from right to left, the rotation of the wheel presses the brake G' upward, and the consequent tilting of the lever H' presses the auxiliary brake I' down upon the periphery of the wheel, while, if the car is proceeding in the reverse direction, the action of the wheel draws brake G' downward and adds to it the pressure of the auxiliary brake I. A similar process in a reversed form takes place with the brake G, and by this means a large amount of power is applied as pressure and friction against the wheels, which is entirely lost when the brakes G G' are simply attached to the truck by stationary fastenings.

I claim—

In combination with post B, cords or chains $c\ c'$, lever C, and brakes G G', the pivoted levers H H', and auxiliary brakes I I' J J', arranged to operate substantially as and for the purpose specified.

In testimony of which invention I hereunto set my hand.

GEORGE W. CROWE.

Witnesses:
HENRY MILLWARD,
J. L. WARTMANN.